United States Patent [19]

Charpak

[11] Patent Number: 5,596,201
[45] Date of Patent: Jan. 21, 1997

[54] DEVICE FOR FORMING IMAGES OF IONIZING PARTICLES BY MEANS OF A MULTI-WIRE PROPORTIONAL CHAMBER

[75] Inventor: Georges Charpak, Paris, France

[73] Assignee: Biospace Instruments, Paris, France

[21] Appl. No.: 208,148

[22] Filed: Mar. 10, 1994

[30] Foreign Application Priority Data

Mar. 11, 1993 [FR] France .................................. 93 02817

[51] Int. Cl.⁶ .............................. G01T 1/18; H01J 47/00
[52] U.S. Cl. ........................................ 250/385.1; 250/374
[58] Field of Search .................................. 345/55, 60, 62; 250/385.1, 385.2, 336, 374; 313/491, 581, 620

[56] References Cited

U.S. PATENT DOCUMENTS

| | | | |
|---|---|---|---|
| 3,743,840 | 7/1973 | Thiessen et al. | 250/336 |
| 4,317,038 | 2/1982 | Charpak | 250/385 |
| 4,686,368 | 8/1987 | Anderson et al. | 250/385.1 |
| 4,965,861 | 10/1990 | Filthuth | 250/385.1 |
| 5,099,129 | 3/1992 | Pullan | 250/385.1 |
| 5,194,738 | 3/1993 | Breskin et al. | 250/385.1 |
| 5,340,989 | 8/1994 | Berthold et al. | 250/385.1 |
| 5,384,462 | 1/1995 | Levitt | 250/385.1 |
| 5,396,073 | 3/1995 | Kasle | 250/385.1 |

FOREIGN PATENT DOCUMENTS

2680010  7/1991  France .

*Primary Examiner*—Richard Hjerpe
*Assistant Examiner*—Kara Farnandez Stoll
*Attorney, Agent, or Firm*—Larson and Taylor

[57] ABSTRACT

A device for forming images of ionizing particles through single-dimensional electrophoresis provided with a multi-wire proportional chamber. The chamber filled with a gas is of asymmetric structure and is formed successively by an entry window for the particles, taken to a negative potential, a multi-wire anode electrode, taken to a potential positive with respect to a reference potential, and a cathode electrode which is placed in the vicinity of the anode electrode. The cathode electrode, which is taken to the reference potential, is formed by a network of parallel electrically conducting strips. Detection of the position of impact of the ionizing particle along the pitch of the network is performed by induction of a delayed electric pulse caused by an avalanche of the ionization electrons issuing from the ionizing particle in the region of the strip situated in line with the impact by the particle in the chamber, the reference time being that of the ionization electrons close to the wires.

13 Claims, 4 Drawing Sheets

DEVICE FOR FORMING IMAGES OF IONIZING PARTICLES BY MEANS OF A MULTI-WIRE PROPORTIONAL CHAMBER

FIELD OF THE INVENTION

The invention relates to a device for forming images of ionizing particles by means of a multi-wire proportional chamber.

BACKGROUND OF THE INVENTION

Numerous applications exist at the present time for which it is desirable to obtain a representation of the spatial distribution of charged particles emerging from a surface, such as, for example, the electrons emitted by a radioactive layer formed by a section of a biological analysis preparation.

Various devices have been described up to now, allowing such representations to be obtained. Among these may be mentioned the European Patent Applications EP 0,395,510 and EP 0,376,762, the inventor of which is Mr. Georges CHARPAK, which describe systems based on the phenomenon of luminous avalanche.

Such devices give satisfaction. However, these devices, entailing optical detection of the abovementioned luminous avalanche phenomenon, are more particularly intended for bidimensional imagery for which resolution per surface points of the order of 0.01 mm² is necessary.

SUMMARY OF THE INVENTION

The subject of the present invention, in contrast, is a device for forming images of ionizing particles by means of a multi-wire proportional chamber, making it possible to obtain a coordinate in a first direction of the entry point of any ionizing particle, and thus of the emission point on the emission surface, with very great accuracy and resolution per unit length less than or equal to 100 µm.

Another object of the present invention is also the implementation of a device for forming images of ionizing particles by means of a multi-wire proportional chamber making it possible, in addition to obtaining a coordinate in a first direction of the entry point of any ionizing particle, and thus of the emission point on the emission surface, with very great accuracy, to obtain a coordinate in a second direction orthogonal to the first direction with a lower precision or resolution per unit length, the image-forming device which is the subject of the present invention allowing analysis or any emission surface by successive strips of maximum resolution per unit length in each analysis strip.

The device for forming images of ionizing particles by means of a multi-wire proportional chamber, the subject of the present invention, is noteworthy in that the chamber, filled with a gas, exhibits an asymmetric structure and is formed successively by an entry window for the ionizing particles, taken to a first electrical potential, negative with respect to a reference potential, a multi-wire anode electrode taken to a second potential, positive with respect to the reference potential, in order to create a uniform electric field between the entry window and the anode electrode. A cathode electrode is placed in the vicinity of the multi-wire anode electrode, this cathode electrode being taken to the reference potential and being formed by a plurality of parallel strips forming a network. The induction of an electrical pulse caused by the ionization electrons, issuing from the ionizing particle in the region of the strip situated in line with the impact of the particle, makes it possible to detect the impact position of this particle in the direction of the pitch of the network with a corresponding resolution.

The device for forming images of ionizing particles, the subject of the present invention, finds application in biological or medical analysis, especially by electrophoresis.

BRIEF DESCRIPTION OF THE DRAWINGS

A more detailed description of the device for forming images of ionizing particles, subject of the present invention, will now be given in connection with the drawings below in which:

FIG. 6b represents an embodiment detail of FIG. 6a.

DESCRIPTION OF THE PREFERRED EMBODIMENTS

A more detailed description of a device for forming images of ionizing particles, in accordance with the object of the present invention, will now be given in connection with FIG. 1 and the following figures.

Figure 1:
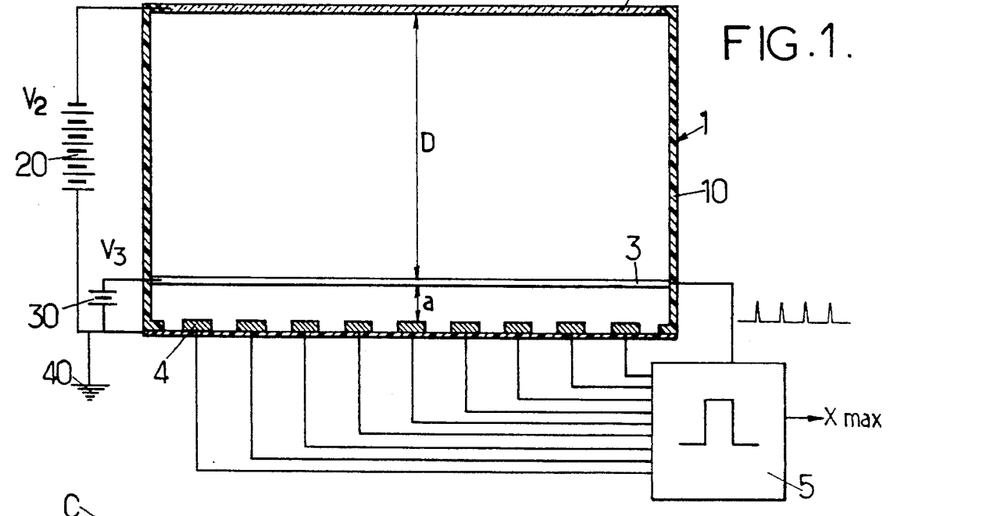
FIG. 1 represents a sectional view of a device for forming images of ionizing particles in accordance with the object of the present invention.

As will be observed in the abovementioned FIG. 1, the device for forming images of ionizing particles, the subject of the present invention, comprises a multi-wire proportional chamber, denoted 1. This chamber comprises a chamber body, denoted 10, formed by a leakproof box made, for example, of plastic, equipped with electrical or electromagnetic screening of conventional type.

According to one particularly advantageous characteristic of the device, the subject of the present invention, the chamber 1 is filled with a gas and exhibits an asymmetric structure formed successively by an entry window, denoted 2, allowing entry to ionizing particles, this entry window being on one face of the chamber proper. The entry window 2 is taken to a first electrical potential, denoted V2, by a DC voltage generator 20, this first potential being negative with respect to a reference potential. The entry window 2 is followed by a multi-wire anode electrode 3, that is to say an anode electrode formed by an alignment of wires, this electrode 3 being taken to a second potential, positive with respect to the reference potential, in order to create an electric field between entry window 2 and anode electrode 3.

Finally, a cathode electrode 4 is placed in the vicinity of the multi-wire anode electrode 3, this cathode electrode 4 being taken to the reference potential 40. It is shown that the anode electrode 3 is taken to the second potential V3 by the use of a DC voltage generator, denoted 30.

According to one advantageous characteristic of the device, the subject of the present invention, the cathode electrode 3 is formed by a plurality of parallel electrically conducting strips, forming a network, which makes it possible, by induction of an electrical pulse caused by ionization electrons issuing from an ionizing particle, induction occurring essentially in the region of the strip situated in line with the impact of this particle on the window 2, to detect the impact position of this particle in the direction of the pitch of the network with a corresponding resolution per unit length.

Thus it is shown that the device, the subject of the present invention, allows a simple construction, with respect to the previously quoted devices of the prior art, to the extent that, all optical detection devices being dispensed with, a reduction in size can easily be envisaged, while wires of long dimensions, up to one metre, may be used. Moreover, in the direction of the wires, along the pitch of the network, a good resolution is obtained while, in the direction perpendicular to the wires, a resolution corresponding substantially to the inter-wire distance can be obtained. Such a device is therefore particularly well suited for electrophoresis on a gel in one dimension.

In one advantageous embodiment of the device for forming images of ionizing particles, the subject of the present invention, as represented in FIG. 1, it is shown that the detection of the electrical pulse induced in the region of a strip, denoted $4k$, of the cathode electrode 4, may be performed by triggering electronic circuits 5 controlled by a delayed triggering pulse, with a duration substantially equal to or slightly less by a duration $\delta T$ than the transit time of the ionization electrons initially emitted in the space lying between the window 2 and the anode electrode 3.

A more detailed description of the operating mode of the device for forming images of ionizing particles, the subject of the present invention, will now be given in connection with FIG. 2a and FIG. 2b.

Figure 2A:
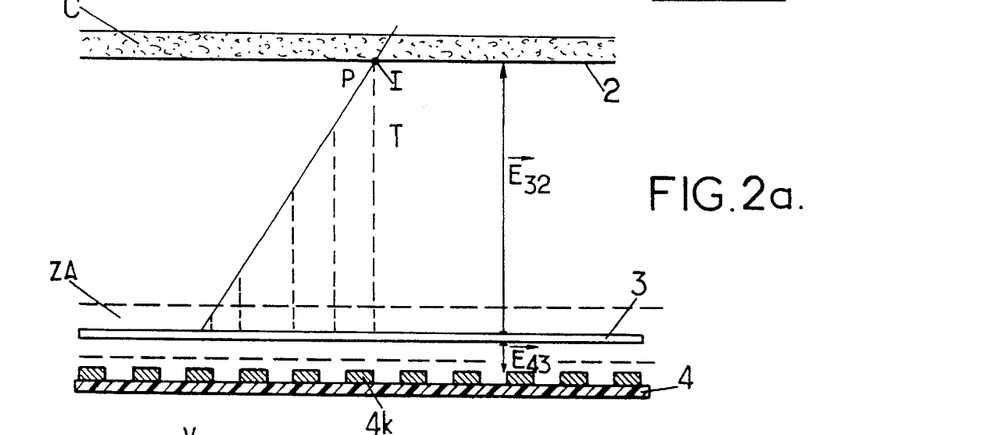
FIGS. 2a and 2b represent a detail of an embodiment of the device for forming images of ionizing particles, the subject of the invention, represented in FIG. 1, and a timing diagram of signals obtained in operation.

In a general way, it is shown that the first (V2) and the second (V3) electrical potentials are chosen such that the electric fields between the window and the anode electrode, the electric field denoted E32, in FIG. 2a, or the anode electrode and the cathode electrode respectively, the electric field denoted E43 in the abovementioned figure, have substantially the same absolute value but an opposite direction.

It is shown moreover that the wires constituting the anode electrode 3 are straight-line wires aligned in a first direction, the horizontal direction in the plane of FIGS. 1, 2a respectively, while the electrically conducting strips, denoted $4k$, constituting the cathode 4, are parallel and aligned in a direction perpendicular to that of the wires constituting the anode 3, that is to say in a direction orthogonal to the plane containing the FIGS. 1 and 2a.

In this same FIG. 2a, a biological section C has been represented placed on the entry window 2, this section being marked radioactively for the purposes of analyses. Upon impact I of an ionizing particle P, the particle P passes through the space lying between the entry window 2 and the anode 3, along a substantially straight-line trajectory, so as to reach the anode 3, and, in particular, the proportional amplification region, denoted ZA, situated in the vicinity of each wire constituting the anode 3, thereby causing, within the gas contained in the inter-electrode space, a succession of emissions of ionization electrons. The displacement time of the particle P from the impact point I along to the anode electrode 3 is negligible by reason of the high speed, relativistic speed, of the emitted ionizing particle P and the ionization electrons, successively emitted by the particle P on its path, are accelerated by the electric field E32, this transit time being proportional to the distance separating the point of emission of the ionization electrons from the electrode 3. Thus, by reason of the extremely short displacement time of the particle P, the ionization electrons emitted in the vicinity of the electrode 3 by the abovementioned particle, and especially in the vicinity of the proportional amplification region ZA, they can constitute a time origin reference of entry of the particle into the interelectrode space consisting of the entry window 2 and the anode 3, for the previous ionization electrons of which the impact on the anode electrode 3 takes place successively with a delay proportional to the distance separating the effective emission point on the trajectory of the particle from the anode electrode 3.

Figure 2B:
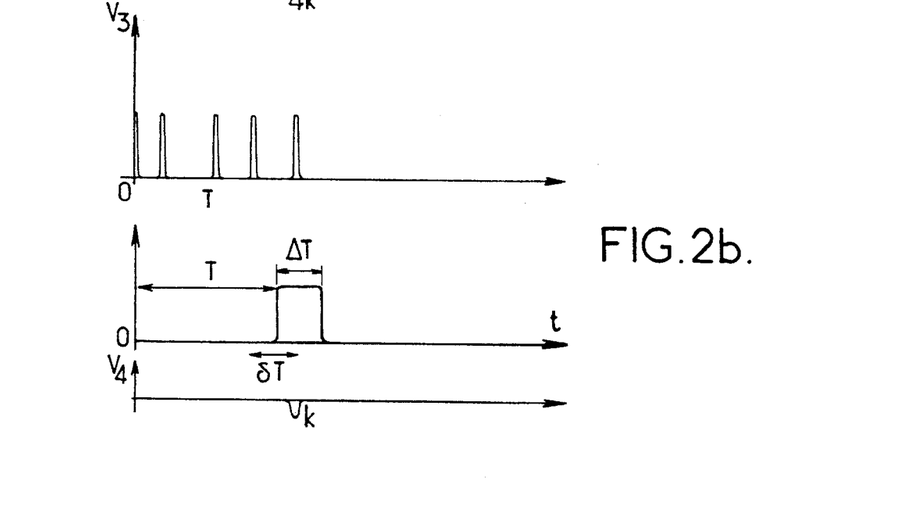

These successive emissions of ionization electrons are then translated on the anode electrode 3 by a series of pulses represented in FIG. 2b, pulses with substantially adjacent amplitude, the last pulse caused on the anode electrode 3 exhibiting the greatest delay T with respect to the original pulse and corresponding to the transit time of the ionization electrons emitted in the region of the impact I of the particle on the entry window 2.

Hence, the triggering of the electronic circuits 5 by a control pulse which is delayed with respect to the origin by a duration substantially equal to, or slightly less by a duration $\delta T$ than, the transit time of the ionization electrons initially emitted in the space lying between the window and the anode electrode makes it possible effectively to fix the position, by virtue of a corresponding pulse induced on the electrode 4 and in particular on the electrically conducting strip, denoted $4k$, situated in line with the ionization electrons initially emitted in the region of the impact I, to determine, in the direction of the pitch of the network consisting of the abovementioned electrically conducting strips, the corresponding coordinate of the previously mentioned impact point. In FIG. 2b the pulse appearing on the electrically conducting strip in question has been represented, this pulse induced by electrostatic coupling of the charges of the avalanche produced on the anode electrode 3 with the cathode electrode 4 exhibiting an opposite polarity to that caused by the charges of the avalanche on the anode electrode 3.

In a general way, it is shown that the transit time T of the ionization electrons initially emitted has a value fixed as a function of the geometric parameters of the chamber, of the value of the electric field E32 as well as of the nature of the gas filling the multi-wire proportional chamber used. It is shown, however, that this fixed time may be adjustable by modifying one of the abovementioned parameters and especially the value of the previously mentioned electric field E32. By way of a non-limiting example, a variation in the transit time T can be brought about in order to obtain a transit time lying between 50 and 500 nanoseconds.

As for the delayed control pulse allowing the selection of the ionization electrons initially emitted and thus representative of the impact point I of the ionizing particle P, it is shown that this control pulse can be produced by a logic pulse of defined duration $\Delta T$. By way of non-limiting example, the duration $\Delta T$ can be taken to be equal to 5 nanoseconds, such precision in the rising edge of the abovementioned delayed control pulse corresponding substantially to a precision of 150 micrometres in the choice of the gas layer in the vicinity of the entry window 2 which contributes to the pulses actually detected, when the delay time T chosen corresponds to a transit time T=150 nanoseconds.

Various characteristics of embodiment of the device for forming images of ionizing particles, the subject of the present invention, will now be given in connection with FIG. 3 and the following figures.

With reference to the abovementioned figure it is shown that the multi-wire anode electrode 3 may be formed by an alignment of network-forming electrically conducting parallel wires the spatial cyclic ratio of which, denoted r, may be taken to be equal to 1/50. Hence, for wires of diameters d, the spacing SW between the wires may be taken to be equal to 50$d$. In one example of embodiment, the wires may exhibit a diameter d=20 micrometres, these wires then being spaced by 1 mm.

Figure 3:
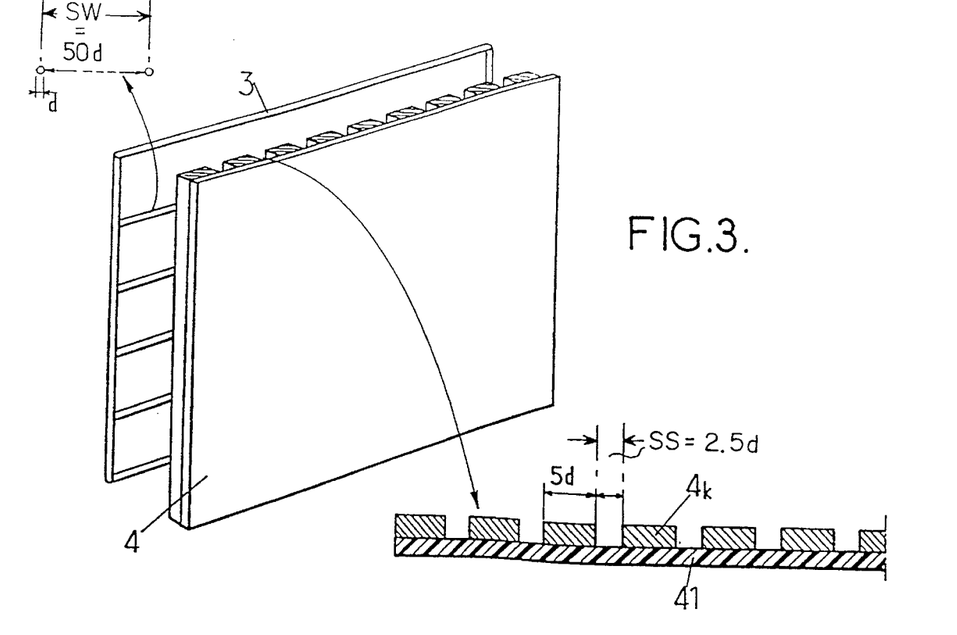
FIG. 3 represents a detail of an advantageous, non-limiting embodiment of the anode and cathode electrodes.

Moreover, as has been represented in the same FIG. 3, the cathode electrode may be formed by parallel electrically conducting strips in such a way as to form a network with spatial cyclic ratio R=2. In one non-limiting embodiment, it is shown that, for wires constituting the anode 3 with diameter d, the conducting strips exhibited a width 5$d$ and were spaced by a distance or spacing SS equal to 2.5 d.

Finally, it is shown that the anode electrode 3 was spaced from the entry window 2 by a distance D, which was taken to be, in the abovementioned embodiment, equal to 3 mm.

In contrast, the cathode electrode 4 may be placed at a distance a substantially equal to 1/10 of the distance D separating the anode electrode 3 from the entry window 2. It is shown, in particular, that the cathode electrode 4 may be produced as parallel metal strips denoted 4$k$ deposited on a plate or sheet of insulating material 41, the assembly being obtained according to a technique comparable to the technique of masking integrated circuits.

In the previously described illustrative embodiment, and for D=3 mm and a=0.3 mm, the gas used being a gas such as argon and a small percentage of methane, any other gas of conventional type, such as an inert gas and an organic vapour, used in proportional multi-wire chambers moreover capable of being used, the first potential V2 had the value −2400 volts and the second potential V3 had the value +240 volts.

Having regard to the previously mentioned elements, the reading of the pulses induced on the strips 4$k$ of the electrode 4 must be performed by means of a fast electronic reading system.

Figure 4:
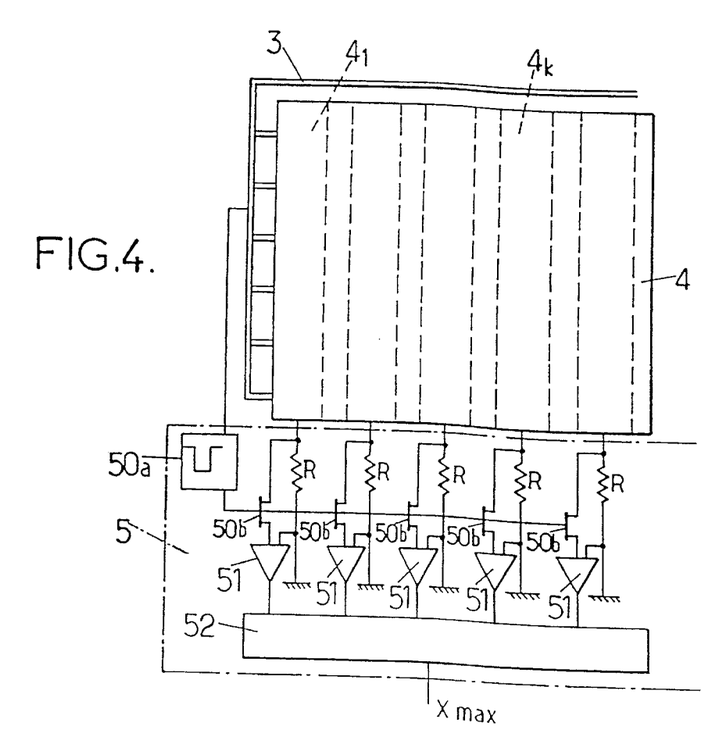
FIG. 4 represents a non-limiting variant embodiment of electronic pulse detection circuits.

In one non-limiting embodiment represented in FIG. 4, each electrically conducting-strip 4$k$ forming the cathode electrode 4 can be linked to the reference potential by means of an impedance or resistor R of high value, several megohms.

Moreover, each electrically conducting strip 4$k$ is linked to a high gain and high input impedance amplifier circuit, denoted 51, by means of a controlled switch circuit 50$b$, for example, the controlled switch circuit being linked electrically to the anode electrode by means of the delay circuit 50$a$ in which the delay period corresponds to the transit time of the ionization electrons initially emitted in the window-anode electrode space, reduced, for example, by an adjustable duration δT which makes it possible to choose the strip of sensitive gas close to the input window. It is shown, obviously, that the circuits 50$a$ and 50$b$ can be produced as a logic circuit, the representation of FIG. 4 corresponding to positive logic, in which the switch circuit 50$b$ is connected in series with the input of the amplifier linked to the corresponding electrically conducting strip 4$k$. It is shown that a negative logic control circuit may also be used and, in such a case, the switch circuit 50$b$ may advantageously be mounted in parallel between the input terminal of the amplifier 51 linked to the electrically conducting strip 4$k$ and the reference potential. The delaying circuit 50$a$ may be produced, for example, by means of a control logic circuit of mono-stable type.

It is also shown that, in the case in which an amplifier 51 with high input impedance is used, the resistor R may be dispensed with.

As has also been represented in FIG. 4, each amplifier 51, associated with a corresponding electrically conducting strip 4$k$, is connected to a processing circuit 52, which makes it possible to determine the order k of the electrically conducting strip which is the seat of the induced pulse, which is thus detected. By way of a non-limiting example, it is shown that the circuit 52 may consist of a fast sampler circuit which may then allow either digital processing of the pulses, or analog processing, taking account particularly of a process for interpolation on the amplitude of the detected pulses.

Figure 5A:
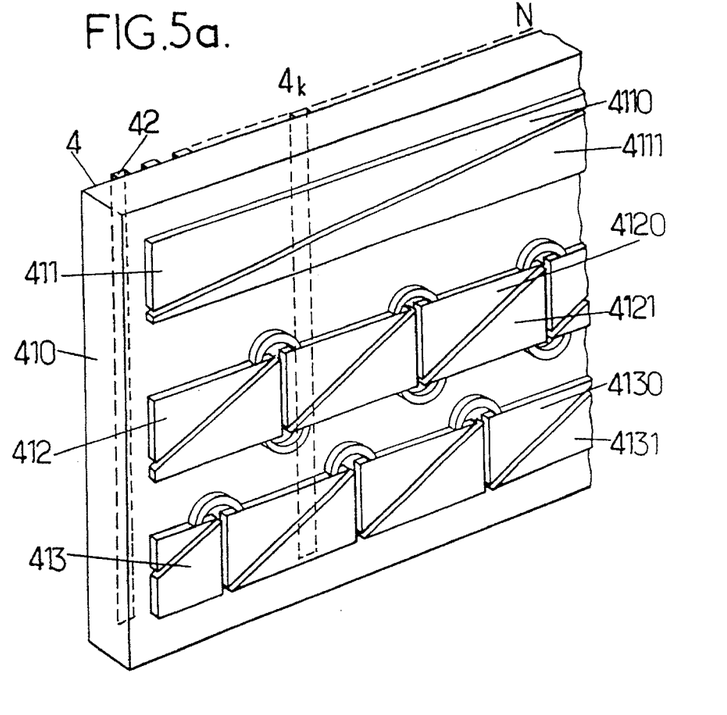
FIGS. 5a and 5b are a perspective view and circuit diagram, respectively, of a particular variant of an embodiment of analog electronic pulse detection circuits, FIG. 6a, in a sectional view, represents a variant embodiment of the device for forming images of ionizing particles, the subject of the present invention, in which the entry window is removable.
Figure 5B:
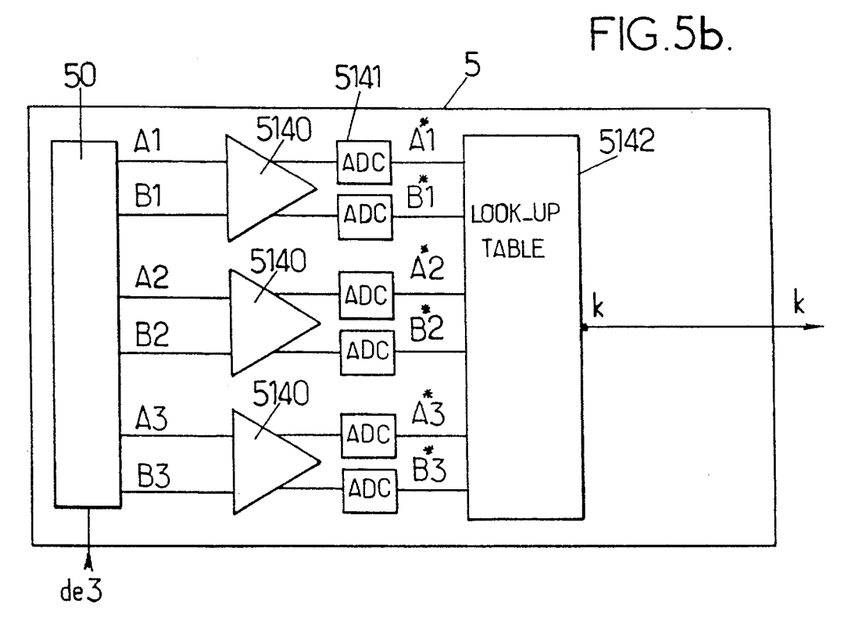

As far as analog processing of the pulses is concerned, it is shown by reference to FIGS. 5$a$ and 5$b$ that the detection can be performed based on a specific detection circuit consisting of an electrostatic circuit represented in FIG. 5$a$, consisting of a capacitive coupling with each band 4$k$ of defined rank k.

The electrostatic detection circuit includes, as represented in the abovementioned figure, at least one first strip, denoted 411, electrically conducting, this conducting strip being subdivided according to a periodic pattern into two elementary strips 4110, 4111 in which the electrostatic coupling with each band 4$k$ is an increasing function, or decreasing function respectively, of the rank k of the strip in question. A circuit represented in FIG. 5$b$ makes it possible to measure the amplitude of the end signal generated at the end of the first and of the second elementary strip, as well as the ratio of the end signals, this ratio being representative of the rank k of the strip in the vicinity of which the ionization electrons have induced the corresponding electrical pulse.

It is shown, moreover, that a second electrically conducting strip, strip 412, may be provided, this second strip being subdivided into a first 4120 and a second 4121 elementary strip according to the same periodic pattern, with a period which is a multiple of the first electrically conducting strip in a given ratio.

The circuit represented in FIG. 5$b$ allows the measurement of the amplitude of the signals generated by capacitive coupling at the end of the first and of the second elementary strip and of the ratio of the amplitude of these end signals. The first and the second electrically conducting strip, associated, as appropriate, with a third strip 413 itself subordered into two elementary strips 4130, 4131, thus forming a measuring system of vernier type of the rank k of the electrically conducting strip 4$k$ situated substantially in line with the initially emitted ionization electrons.

In FIG. 5$b$, 50 designates a logic circuit analogous to the circuits 50$a$, 50$b$ of FIG. 5$a$, 5140 designates amplifier circuits, 5141 analog/digital converter circuits and 5142 a conversion table making it possible to deliver the rank k of the strip 4$k$ on which the pulse has been detected.

For a more detailed description of the operation of the electrostatic detection system represented in FIG. 5$a$ and 5$b$ reference may usefully be made to the French Patent Application No. 2,680,010.

It is also shown that the delay time for control of the reading of the pulses induced on the corresponding electrically conducting strips 4k may further be adjusted, as can the reading time of these pulses, the logic gate and, in particular, the rising edge of the control pulse for reading the pulses on the strips and the read duration thus being able to be modulated, in such a way as to carry out reading of all the pulses present on each band. It is then possible to determine the centroid of the amplitudes of the pulses generated by the ionization electrons liberated at the entry to the multi-wire chamber, that is to say upon impact of the particles on the entry window. The processing may then be performed digitally after sampling of the pulses on the various strips.

It is also shown that, needless to say, the relative dimensions and spaces separating the various electrodes can be modified, provided that the asymmetric nature of the chamber is maintained, the distance separating the cathode 4 from the anode electrode 3 possibly being taken to be equal, for example, to 0.5 mm. It is then possible to measure, on the electrically conducting strips 4k, the height of the pulse induced by the avalanches produced by the delayed electrons coming from the entry window of the chamber and the calculation of the centroid of these amplitudes then makes it possible to determine the position of the ionization electrons initially emitted along the wire with an accuracy of the order of 100 micrometers.

As far as the fields of application of the device for forming images of ionizing particles, the subject of the present invention, are concerned, it is shown that the latter may advantageously be applied to analysis by electrophoresis in one dimension, the anode electrode 3 possibly then being subdivided into a plurality of elementary anode electrodes grouping together four to five wires in parallel, these elementary electrodes being successively superimposed so as to produce a plurality of analyses by electrophoresis, superimposed in a direction perpendicular to the direction of alignment of the wires.

Finally, it is shown that the asymmetric character of the multi-wire chamber resulting from the disparity in the distances separating the entry window 2 and the anode electrode 3, on the one hand, and the anode electrode 3 and the cathode electrode 4, on the other hand, makes it possible, by reason of the coupling of the charges of the avalanche between the cathode electrode 4 and the anode electrode 3, thus to carry out detection of the pulses induced on the parallel electrically conducting strips constituting the cathode 4.

One of the problems due to the very small distance between the cathode electrode 4 and the anode electrode 3 which is likely to appear is the displacement of the wires of the anode electrode 3 attracted by the electrostatic forces towards the cathode electrode 4. Such a phenomenon is capable of causing a variation in gain along each wire. Such a phenomenon may be corrected by placing the electrically conducting strips 4k at slightly varying potentials compensating for this attraction. In such a case, the biasing of the strips may be performed on the basis of previously mentioned resistors R and auxiliary generators, not represented in the drawing, the link to the amplifiers 51 then being achieved by the use of a capacitive link.

One advantageous variant of a device for forming images of ionizing particles in accordance with the object of the present invention will now be described in relation with FIGS. 6a and 6b.

Figure 6A:
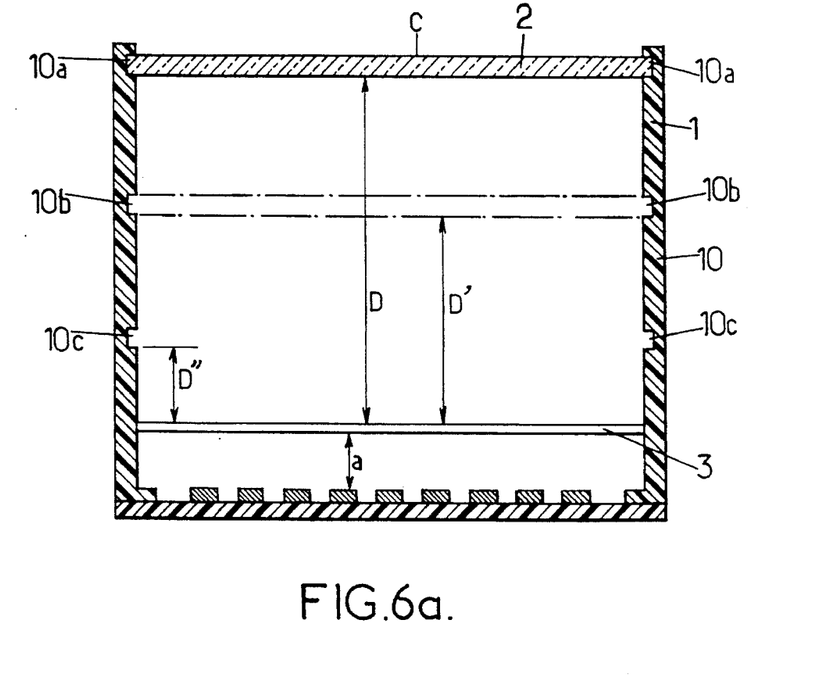

According to the abovementioned FIG. 6a, the device, the subject of the present invention, in one advantageous embodiment variant, is such that the entry window 2 of the ionizing particles is removable. Such a characteristic makes it possible to create different anode electrode 3-entry window 2 spaces, which, for different values of the distance D separating the anode electrode from the entry window and for different gases filling the proportional chamber and in particular the space between the anode electrode 3 and the entry window 2, the asymmetric character of the chamber being preserved, makes it possible to perform image formation of the same object marked by different radioactive elements according to different elementary images.

In FIG. 6a, the chamber body 10 has been represented, exhibiting different emplacements 10a, 10b and 10c intended to accommodate the removable entry window 2. The latter can thus be placed in the region of the emplacements 10a, 10b and 10c in such a way as to create distances D, D' or D" separating the anode electrode 3 from the entry window 2 of different value. Needless to say, the asymmetric characteristic of the chamber is thus preserved, which makes it possible to produce imagery of the same object, denoted C, C representing a biological section, for example, this object C being marked by different radioactive elements.

It will be understood, in particular, that for different values D, D', D" separating the entry window 2 from the anode electrode 3, it is thus possible, for different gases, for example, different gases making it possible to obtain a different absorption of the radioactive particles emitted by the different radioactive elements, to obtain, for a defined position of the entry window 2, and of the corresponding body C to be analyzed, different elementary images which are representative of the emission of one or more radioactive marking elements, as will be described below in the description.

The operating mode of the imagery device as represented in FIG. 6a is as follows.

The distance D, D', D" may be chosen in such a way that certain marking radio-elements emit radiation which does not reach the anode electrode wires 3 for a given gas. It will be understood, needless to say, that for the gas in question, the radiations which do not reach the wires are therefore absorbed by the gas.

It is thus possible to mark a sample C with two radioactive isotopes, for example, denoted I1 and I2.

The isotope I1 may be emitting soft radiation whereas the isotope I2 may be emitting high-energy radiation.

It is then possible to perform the measurements and the image detection with a heavy gas, denoted G1, this heavy gas filling the chamber and, in particular, the space between the entry window 2 and the anode electrode 3. This heavy gas stops the $\beta$ particles emitted by the radioactive element I1, without, however, stopping the $\beta$ particles emitted by the radioactive element I2. The measurement or the detection may then be performed with a light gas, denoted G2, which lets through the particles emitted by the radioactive elements I1 and I2 without prohibitive attenuation.

A comparison of the two elementary images obtained during the two detections makes it possible to determine the relative contribution of the radioactive marking element I1 and of the radioactive marking element I2.

By way of non-limiting example, it is shown:
the radioactive marking element I1 may consist of tritium, the gas filling the chamber being, for example, an inert gas, such as xenon, and the distance being chosen to be equal to D'=2 mm which makes it possible to stop the $\beta$ particles emitted by the above-mentioned marking element consisting of tritium, the second marking element being phosphorus, for example, which passes through this thickness of xenon practically without absorption.

The second gas chosen G2 may then consist of helium.

It is also shown that the first radioactive marking element may consist of isotope 35 of sulphur $S^{35}$, whereas the second radioactive marking element may also consist of isotope 32 of phosphorus, $P^{32}$. In such a case, the distance D may be taken to be equal to 1.5 cm. The radiation from sulphur is very much absorbed by the xenon, in contrast to that emitted by the isotope 32 of the phosphorus. It is shown moreover that, even in the case in which the absorption of the β particles from the radioactive marking element I1 is not total, the comparison of the two elementary images makes it possible to calculate the relative contribution of each marking element I1 and I2.

Figure 6B:
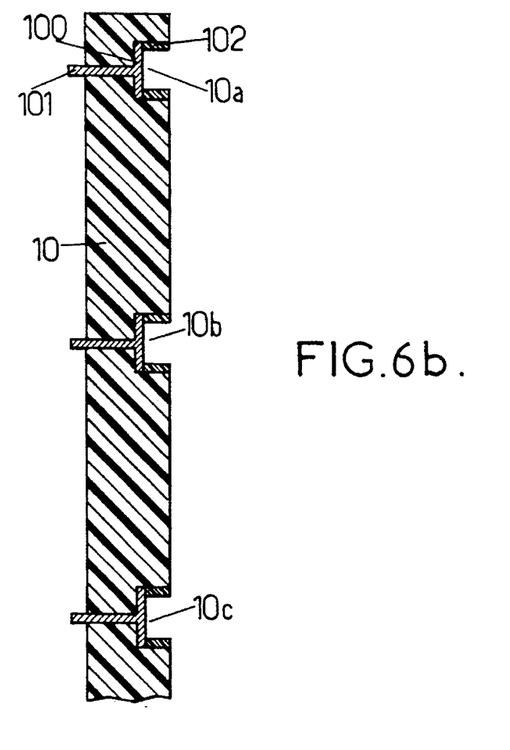

As to the practical embodiment of the device, the subject of the present invention, as represented in FIG. 6a, it is shown, in relation with FIG. 6b that each emplacement 10a, 10b and 10c may comprise a groove intended to accommodate the removable entry window 2, this groove essentially including a conducting metal sole plate 100 at the bottom of the groove, linked to a contact stud 101, which is intended to receive the polarization voltage V2 making it possible to provide the appropriate polarization of the entry window 2. Moreover, as represented in FIG. 6b, the side walls, other than the back wall of the groove constituting each emplacement 10a, 10b or 10c, may then comprise a coating 102 which is, needless to say, an insulating coating intended to provide sufficient sealing for the chamber with respect to the gas intended to fill it. It is shown that the coating 102 may be produced, for example, as a coating of polytetrafluoroethylene. The entry window 2 is then forcibly inserted into the corresponding emplacements 10a, or 10b, 10c in such a way as to obtain the chosen value for the distance D, D', D". It is shown, as for the sealing, that the latter should make it possible, at most, to withstand an internal pressure of the gas in the chamber of the order of 1.5 bar, the corresponding supply of gas to the chamber being performed, during operation, in a slight overpressure with respect to atmospheric pressure.

The operating mode of the imagery device, the subject of the present invention, as described in connection with FIG. 6a thus makes it possible to implement a method of forming images of ionizing particles which is particularly attractive to the extent that the body to be analyzed C being marked by a plurality of distinct radioactive elements emitting ionizing particles with different energy levels, this method consists in performing detection of the position of impact of the particles emitted by a radioactive element in the presence of a gas in the entry window-anode electrode space, for a distance D separating the entry window from the anode electrode in order to obtain an elementary image, then in performing a successive detection of the position of impact of the particles emitted by at least one other radioactive element in the presence of another, different gas, in the entry window-anode electrode space in order to obtain another elementary image. Such an operating mode then makes it possible, by comparative analysis of the abovementioned elementary images, to determine the relative contribution of the radioactive elements.

It is understood, needless to say, that the number of radioactive marking elements or different isotopes may be greater than two, and that, in consequence, it is possible to perform successive detections in such a way, upon each detection, to obtain an elementary image consisting, for example, of the contribution of a defined marking isotope.

It is then shown, in accordance with a particularly advantageous aspect of the method which is the subject of the present invention, that the successive detection or detections are performed for different values of the distance D', D" separating the entry window 2 from the anode electrode 3.

Finally, as to the applications of the device for forming images of ionizing particles, the subject of the present invention, it is shown that the ionizing particles detected may be those corresponding to a β radiation or those corresponding to the emission of slow neutrons. In this latter case, it is shown that it is possible to use a sheet of gadolinium in the vicinity of the anode electrode 3, allowing the emission of a local electron each time a slow neutron is absorbed. It will be understood, needless to say, that any layer which exhibits a high coefficient of emission of secondary electrons by high-energy β rays may advantageously be used for forming images of β rays. It is also shown that an imagery of slow neutrons may be performed on the basis of a layer of boron allowing the emission of an α particle each time a slow neutron is absorbed by the abovementioned boron layer.

I claim:

1. A device for forming images of ionizing particles, by means of a multi-wire proportional chamber, wherein said chamber, filled with a gas, exhibits an asymmetric structure formed successively by:

an entry window for the ionizing particles, taken to a first electrical potential which is negative with respect to a reference potential, a multi-wire anode electrode taken to a second potential which is positive with respect to said reference potential in order to create an electric field between said entry window and said anode electrode, a cathode electrode placed in the vicinity of the said multi-wire anode electrode, said cathode electrode, which is taken to the reference potential, being formed by a plurality of parallel electrically conducting strips forming a network, which makes it possible, by induction of an electric pulse caused by ionization electrons issuing from the ionizing particle in the region of one of the strips, by means of an avalanche situated in line with the impact by said particle, to detect the position of impact of this particle in the direction of the pitch of the network with a corresponding resolution.

2. The device according to claim 1, wherein the first and second electrical potentials are chosen such that the electric fields between the window and the anode electrode, and the anode electrode and the cathode electrode, respectively, have substantially the same absolute value.

3. The device according to claim 1, wherein said multi-wire anode electrode is formed by an alignment of network-forming parallel wires, with spatial cyclic ratio r=1/50, the said cathode electrode being formed by parallel strips perpendicular to the wires of the anode electrode, forming a network with spatial cyclic ratio R=2, the said anode electrode being formed by conducting wires with diameter d, spaced apart from one another by a distance SW equal to 50d, and the said cathode electrode being formed by conducting strips of width equal to 5d spaced by a distance SS equal to 2.5d, said anode electrode being spaced from said entry window by a distance D and said cathode electrode being spaced from said anode electrode by a distance equal to D/10.

4. The device according to claim 3, wherein each electrically conducting strip forming said cathode electrode is linked to the reference potential by means of a high-value impedance.

5. The device according to claim 4, wherein each electrically conducting strip is linked to a high-gain amplifier circuit with high input impendance, by means of a controlled switch circuit, said controlled switch circuit being linked electrically to said anode electrode by means of a delaying circuit in which the delay period corresponds substantially to the transit time of the ionization electrons initially emitted in the anode electrode window space.

6. The device according to claim 1, wherein detection of said electrical pulse is performed by triggering electronic circuits controlled by a triggering pulse delayed by a duration substantially equal to the transit time of the ionization electrons initially emitted in the space lying between the window and the anode electrode.

7. The device according to claim 6, wherein said triggering pulse is delayed by a duration equal to the transit time of the electrons reduced by an adjustable duration $\delta T$ thereby allowing selection of the sensitive gas strip close to the entry window.

8. The device according to claim 1, wherein the gas filling the inter-electrode spaces is a gas belonging to the argon and methane group, an inert gas and organic vapour.

9. The device according to claim 1, wherein said entry window for the ionizing particles is removable, so as to create different anode electrode-entry window spaces, thereby allowing, for different values of the distance D separating anode electrode-entry window and/or for different gases, the asymmetric character of the chamber being preserved, imagery of the same object marked by different radioactive elements according to different elementary images, to be produced.

10. A method of forming images of ionizing particles issuing from a radioactively marked body, using a device for forming images of ionizing particles formed by means of a multi-wire proportional chamber filled with a gas and exhibiting as asymmetric structure successively formed by an entry window for the ionizing particles taken to a first electrical potential which is negative with respect to a reference potential, a multi-wire anode electrode taken to a second potential which is positive with respect to the said reference potential in order to create an electric field between said entry window and said anode electrode, said anode electrode and entry window being separated by a distance D, and a cathode electrode placed in the vicinity of said multi-wire anode electrode and taken to the reference potential, said cathode electrode being formed by a plurality of parallel electrically conducting strips forming a network, which makes it possible, by induction of an electric pulse caused by ionization electrons issuing from the ionizing particle in the region of one of the strips, to detect the position of impact of this particle in the direction of the pitch of the network with a corresponding resolution, wherein said body being marked by a plurality of distinct radioactive elements emitting ionizing particles, with different energy level, said method comprising:

performing a detection of the impact position of the particles emitted by a radioactive element, in the presence of a gas in the entry window-anode electrode space, for a distance D separating the entry window from the anode electrode in order to obtain an elementary image, performing a successive detection of the position of the impact of the particles emitted by at least one other radioactive element in the presence of another, different gas in the entry window-anode electrode space in order to obtain another elementary image, thereby allowing, by comparative analysis of the said elementary images, a determination of the relative contribution of said radioactive elements.

11. The imaging method according to claim 10, wherein the successive detection or detections are performed moreover for different values of distance separating the entry window from the anode electrode.

12. A device for forming images of ionizing particles using a multi-wire proportional chamber, said chamber, filled with a gas, comprising an asymmetric structure formed successively by:

an entry window for the ionizing particles, taken to a first electrical potential which is negative with respect to a reference potential, a multi-wire anode electrode taken to a second potential which is positive with respect to said reference potential in order to create an electric field between said entry window and said anode electrode, said multi-wire anode electrode being formed by an arrangement of network-forming parallel wires, with spatial cyclic ratio $r=1/50$, a cathode electrode placed in the vicinity of the said multi-wire anode electrode, said cathode electrode, which is taken to the reference potential, being formed by a plurality of parallel electrically conducting strips forming a network, so as to make it possible, by induction of an electric pulse caused by ionization electrons issuing from the ionizing particle in the region of one of the strips, by means of an avalanche situated in line with the impact by said particle, to detect the position of impact of said particle in the direction of the pitch of the network with a corresponding resolution, said cathode electrode comprising parallel strips disposed perpendicular to the parallel wires of the anode electrode, and said strips forming a network with spatial cyclic ratio $R=2$, said anode electrode being formed by conducting wires with diameter d, said conducting wires being spaced apart from one another by a distance SW equal to 50d, and said cathode electrode being formed by conducting strips of width equal to 5d and spaced by a distance SS equal to 2.5d, said anode electrode being spaced from said entry window by a distance D and said cathode electrode being spaced from said anode electrode by a distance equal to D/10.

13. A device for forming images of ionizing particles, by means of a multi-wire proportional chamber, wherein said chamber, filled with a gas, exhibits an asymmetric structure formed successively by:

an entry window for the ionizing particles, taken to a first electrical potential which is negative with respect to a reference potential, a multi-wire anode electrode taken to a second potential which is positive with respect to said reference potential in order to create an electric field in the space between said entry window and said anode electrode, a cathode electrode placed in the vicinity of said multi-wire anode electrode, said cathode electrode, which is taken to said reference potential, being formed by a plurality of parallel electrically conducting strips forming a network so as to enable, by induction of an electrical pulse caused by ionization electrons issuing from the ionizing particle in the regions of one of the strips, by means of an avalanche situated in line with the impact by said particle, to detect the position of impact of said particle in the direction of the pitch of the network with a corresponding resolution, and triggering electronic circuits for detecting said electrical pulse, said triggering electronic circuits being controlled by a triggering pulse delayed by a duration substantially equal to the transit time between said entry window and said anode electrode of ionization electrons initially emitted in said space therebetween.

* * * * *